May 19, 1931. H. L. ADAMS 1,806,233
GASOLINE MOTOR
Filed April 22, 1929  3 Sheets-Sheet 2

H. L. Adams
Inventor
By C. A. Snow & Co.
Attorneys.

May 19, 1931.  H. L. ADAMS  1,806,233
GASOLINE MOTOR
Filed April 22, 1929   3 Sheets-Sheet 3
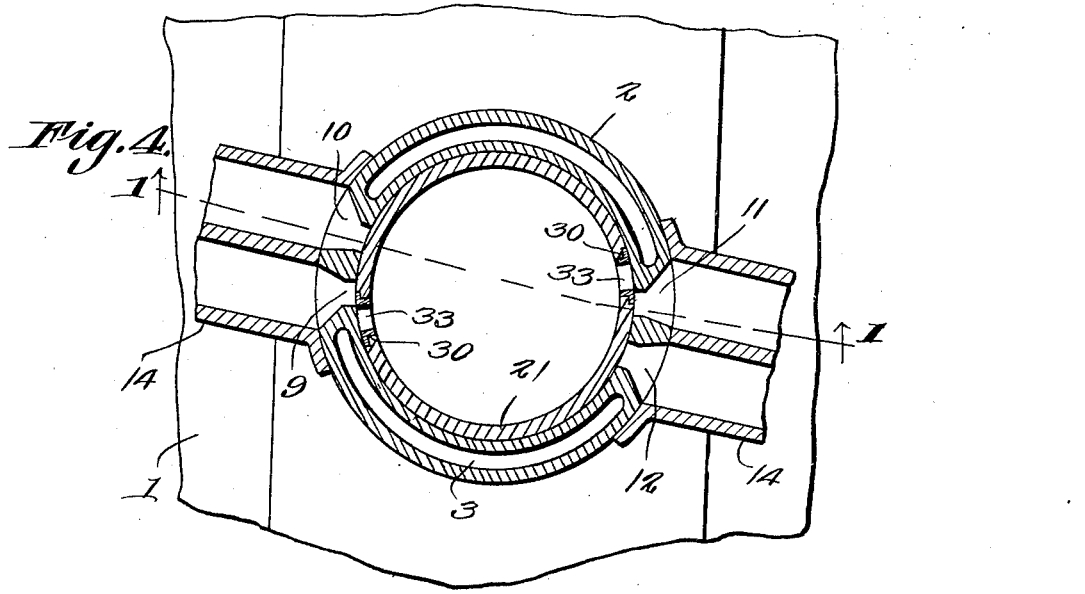
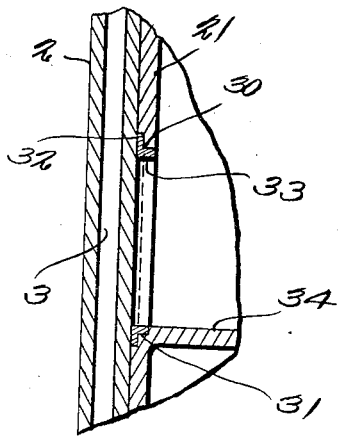
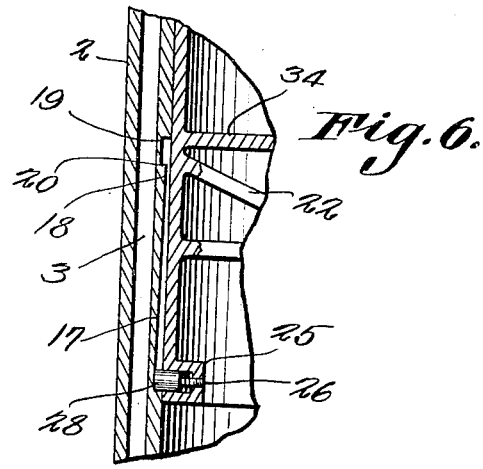
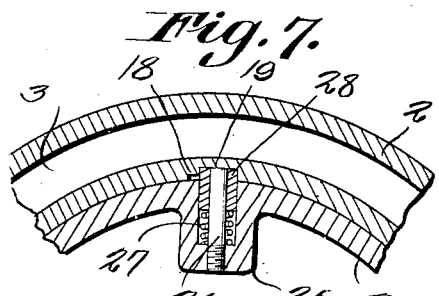
H. L. Adams
Inventor
By C. A. Snow & Co.
Attorneys.

Patented May 19, 1931

1,806,233

UNITED STATES PATENT OFFICE

HARRY LEE ADAMS, OF ELVINS, MISSOURI

GASOLINE MOTOR

Application filed April 22, 1929. Serial No. 357,232.

This invention aims to provide novel means for rotating the piston of an internal combustion engine, as the piston reciprocates, the construction being such that valves may be dispensed with, a simple but efficient engine resulting.

The invention aims to improve devices of the type hereinafter described, and it is understood that a mechanic, governed by the claims, may make changes in the precise form shown, without departing from the spirit of the invention.

Figure 1:
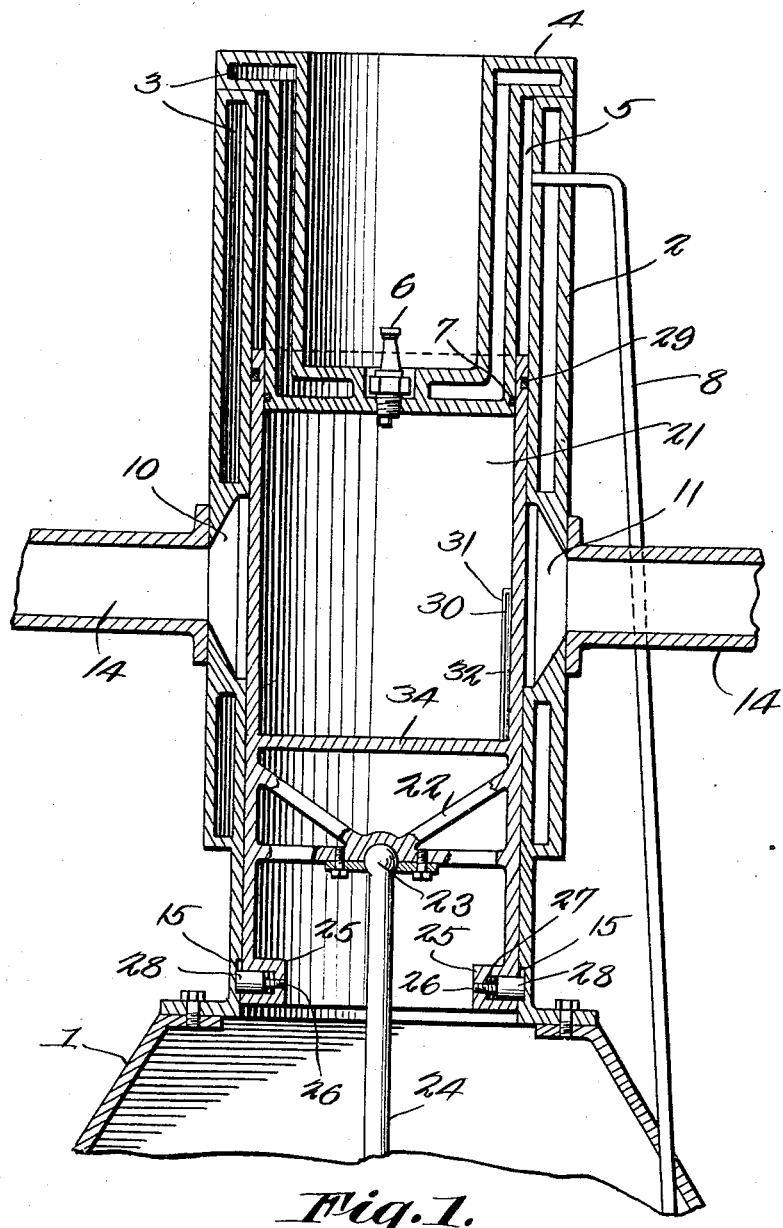
Figure 2:
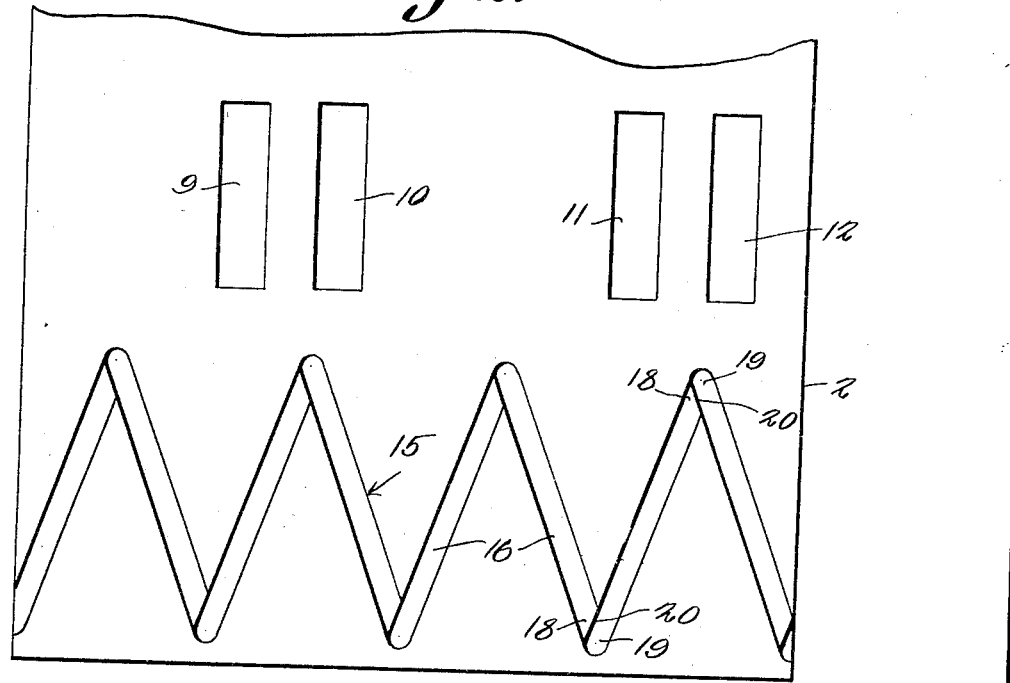
Figure 3:
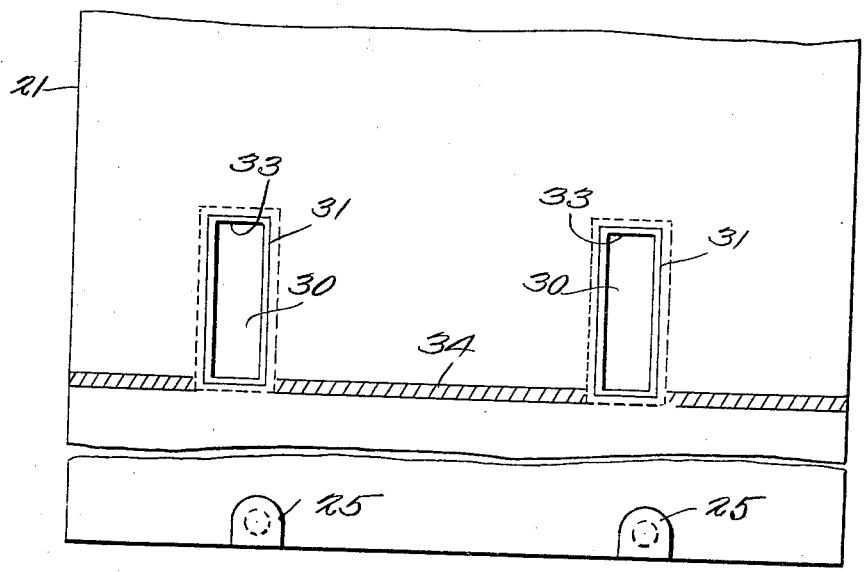

Figure 1 is a longitudinal section; Figure 2 is a view showing the cylinder developed; Figure 3 is a view showing the piston developed; Figure 4 is a horizontal or transverse section (in this view, line 1—1 shows where Figure 1 is cut); Figure 5 is a section through the port in the piston; Figure 6 is a section through the guide groove in the cylinder; Figure 7 is a cross section through the projection on the piston.

On a base or crank case 1 is secured a cylinder 2 water-jacketed at 3 and carrying an inwardly-projecting hollow head 4, there being a space 5 between the head and the cylinder wall, the inner end of the head carrying a spark plug 6 and a packing ring 7. Oil from the crank case 1 is delivered through a tube 8 into the space 5. The cylinder 2 has an exhaust port 9 and an intake port 10 located side by side, and has an exhaust port 11 disposed opposite to the intake port 10, the port 11 located by the side of an intake port 12 arranged opposite to the exhaust port 9, as Figure 4 shows. Suitable conduits 14 for the ports 9, 10, 11, and 12, are attached to the cylinder 2. Around the inside of the cylinder 2 extends a zig-zag guide groove 15, the constituent members 16 of which slant lengthwise of the cylinder, as at 17 in Figure 6, the shallow part 18 of one member 16 of the groove 15 being disposed immediately adjacent to the deepest part 19 of the next-adjoining member 16, to form a shoulder 20 where one groove-members 16 communicates with an adjoining groove-member.

A cup-shaped piston 21 slides in the cylinder 2 and in the space 5 and includes a partition 34, the piston carrying a packing ring 29. The pitman 24 is connected by a ball and socket joint 23 with a frame 22 on the piston 21, so that when the piston reciprocates with the pitman, it can rotate with respect to the pitman. At its inner end, the piston 21 has inwardly-projecting sockets 25 in which are secured studs 26 surrounded by compression springs 27 that thrust outwardly, sleeves 28 slidable on the studs and in the sockets 25, the sleeves constituting spring-advanced projections that ride in the zig-zag groove.

There are ports 30 through the wall of the piston 21, and these ports have reduced extensions 31 at their inner ends. Frames 32 fit closely in the ports 30 and have necks 33 received in the extensions 31 of the ports. Pressure inside the piston 21 finds its way underneath the frames 32, and this circumstance, coupled with the further fact that the cracks around the frames 32 get full of carbon in a short time, prevent any leakage about the frames, the frames being shoved out against the cylinder 2 by the pressure within or behind the frames, and the carbon acting as a sealing medium.

In practical operation, the charge is compressed within the piston 21 between the platform 34 and the inner end of the head 4. The sleeves or projections 28 ride in the zig-zag groove 15 and cause the piston 21 to rotate, the ports 30 of the piston being brought into registration with the ports 9—10—11—12 of the cylinder in properly-timed relation. The springs 27 keep the outer ends of the sleeves 28 in the groove 15, and the shoulders 20, cooperating with the sleeves or projections 28, positively prevent retrograde movement of the piston 21, as it rotates, the piston, of course, having a combined rotary and reciprocatory movement.

The general construction is such that no counter-shaft, cam shaft, or valve is necessary, and the invention produces a highly efficient and correspondingly simple invention.

I claim:

1. In an internal combustion engine, a cylinder having a zig-zag guide groove, a piston mounted to reciprocate in the cylinder, the piston and the cylinder having ports so located as to be capable of registration, the piston being provided with a socket, a stud mounted in the socket, a sleeve slidable on the stud and in the socket, and a compression spring in the socket, about the stud, and cooperating with the sleeve to advance the sleeve and cause the sleeve to cooperate with the guide groove, thereby to rotate the piston and cause the ports of the piston and the cylinder to register.

2. In an internal combustion engine, a cylinder having a zig-zag groove, the base walls of the constituent members of the groove slanting longitudinally of the cylinder, so that the shallowest part of one member of the guide groove is immediately adjacent to the deepest part of an adjoining member of the guide groove, whereby to form a rigid, integral shoulder, a piston mounted to reciprocate in the cylinder and having a socket, the piston and the cylinder having ports so located as to be capable of registration, a projection slidable in the socket and cooperating with the guide groove, to rotate the piston and cause the ports of the piston and the cylinder to register, and a spring housed in the socket and constituting means for advancing the projection and keeping the projection engaged with the base of the guide groove, the spring constituting means for advancing the projection with respect to the shoulder, thereby to prevent retrograde rotation of the piston.

In testimony that I claim the foregoing as my own, I have hereto affixed my signature.

HARRY LEE ADAMS.